Dec. 19, 1950 F. A. EICH ET AL 2,534,343
HEEL BREASTING MACHINE
Filed July 28, 1949 12 Sheets-Sheet 12

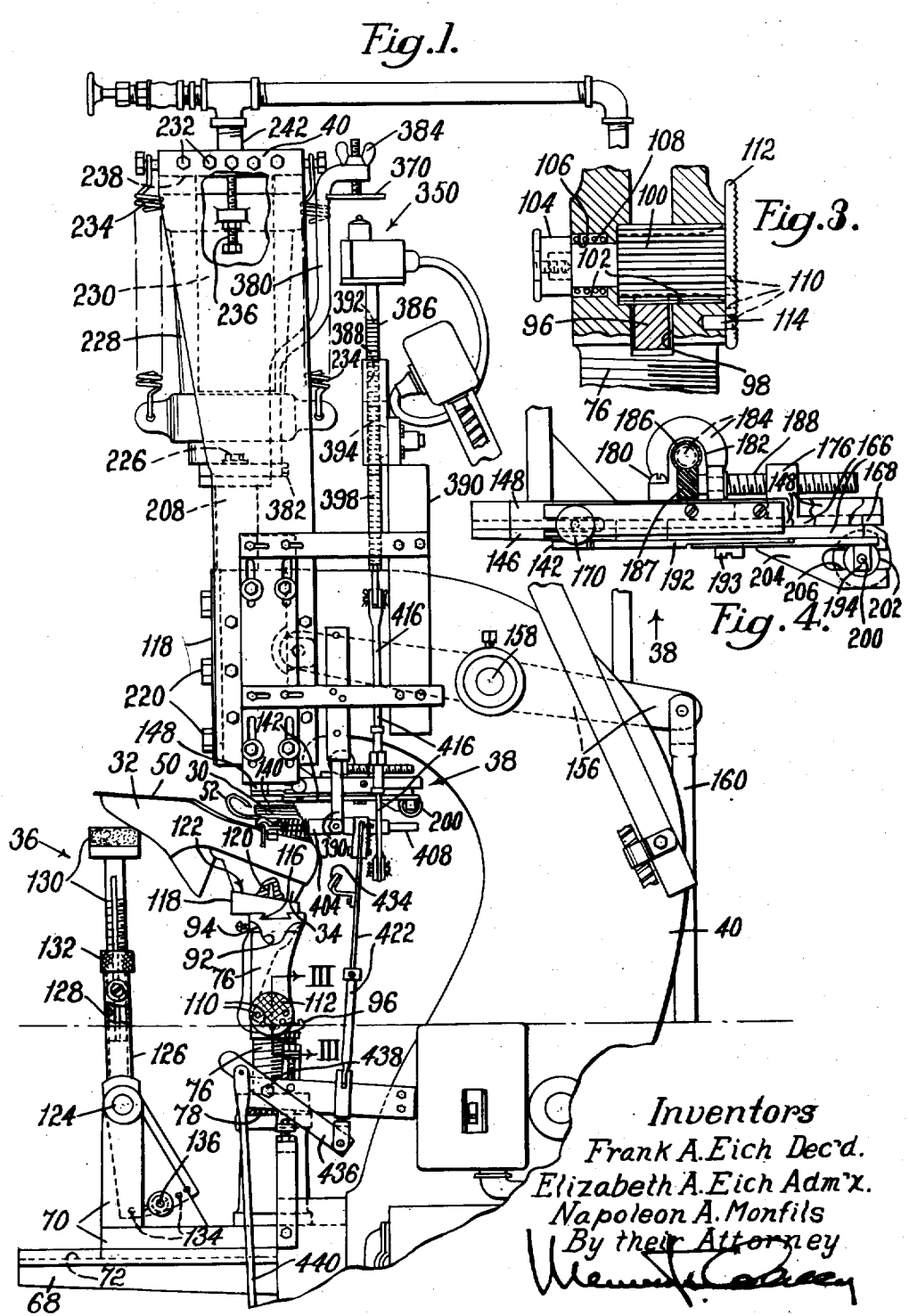

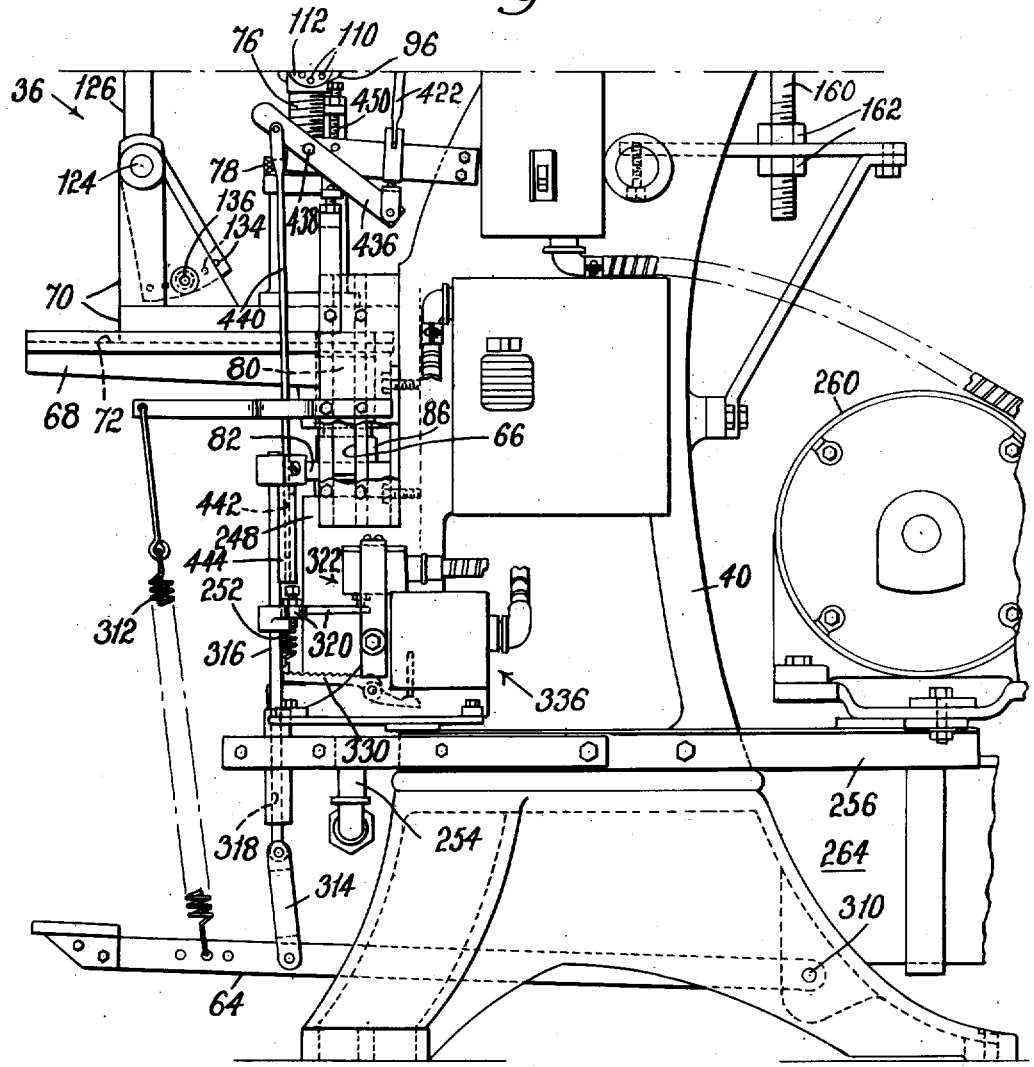

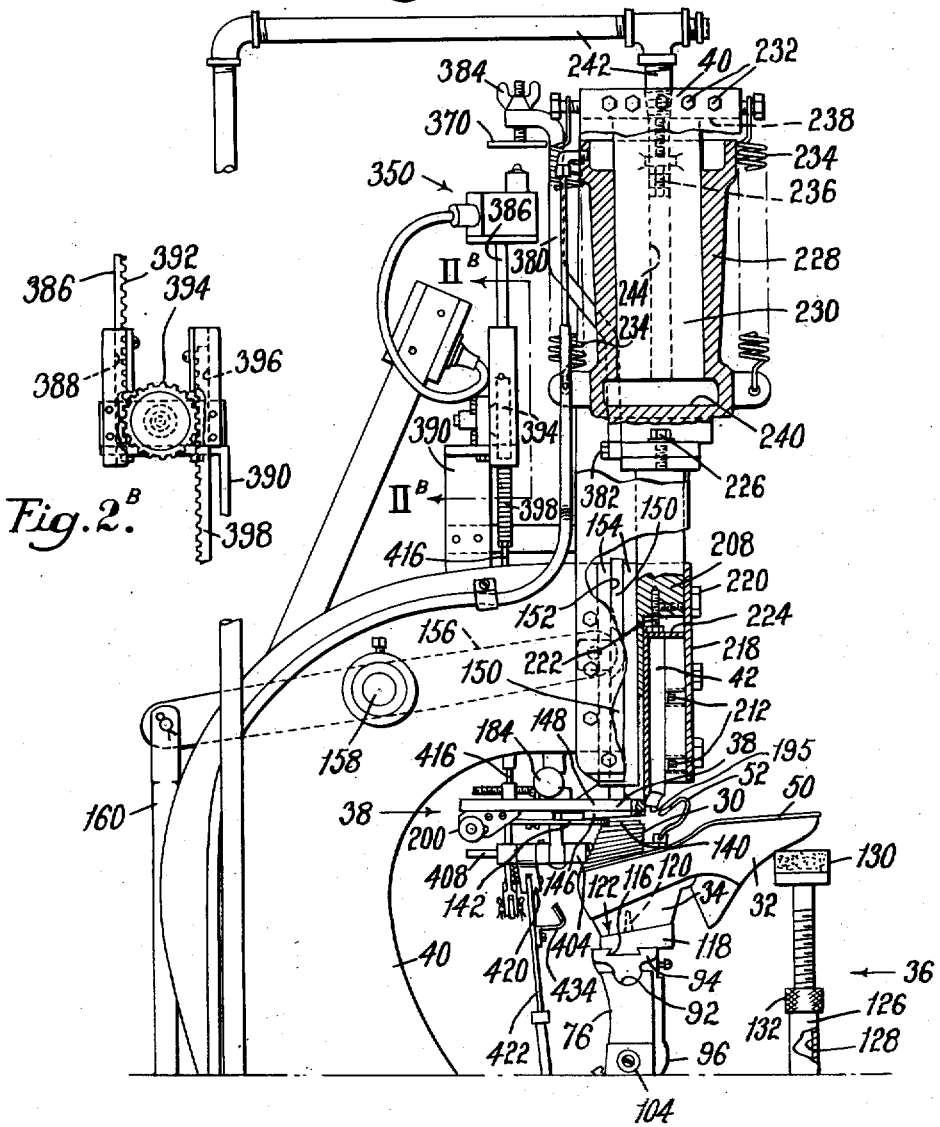

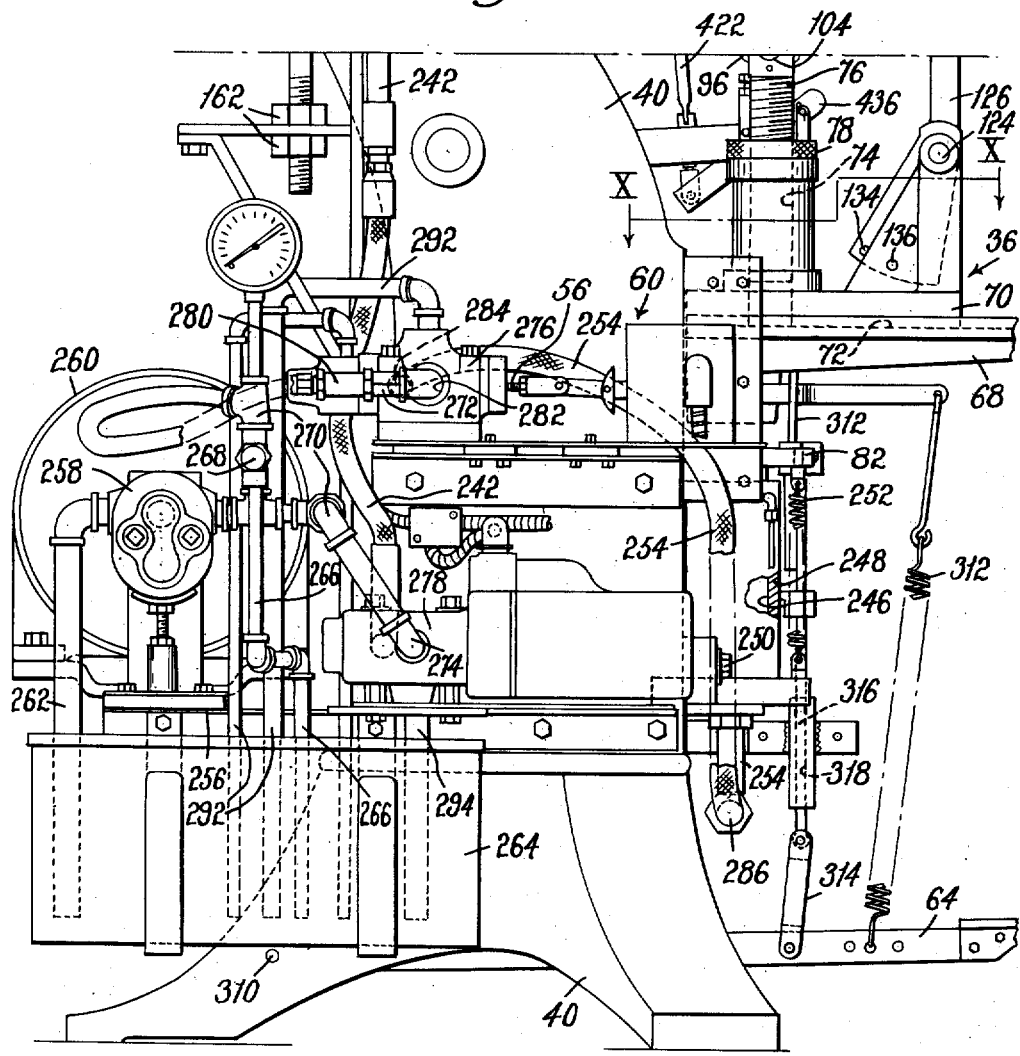

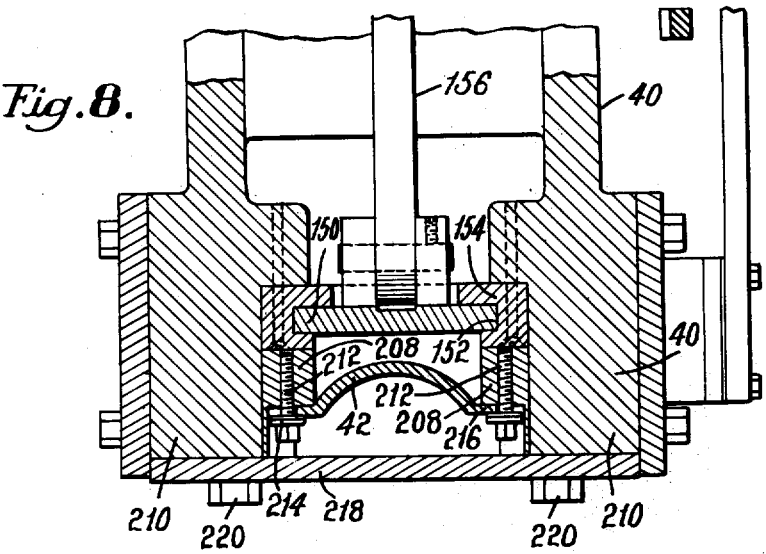
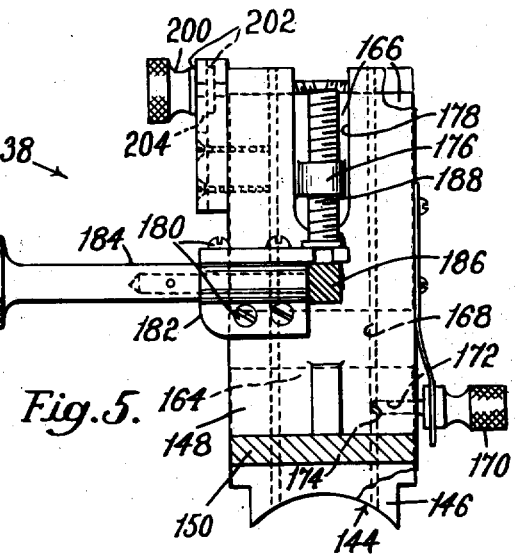
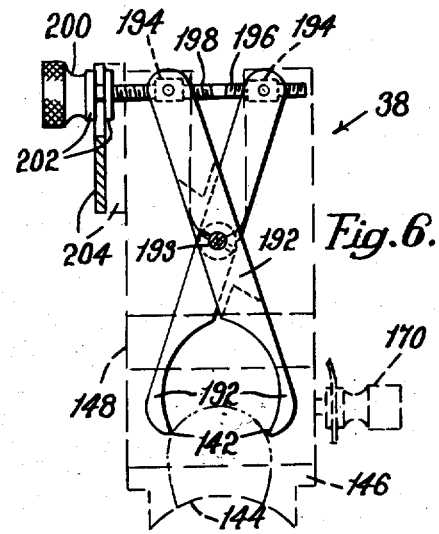

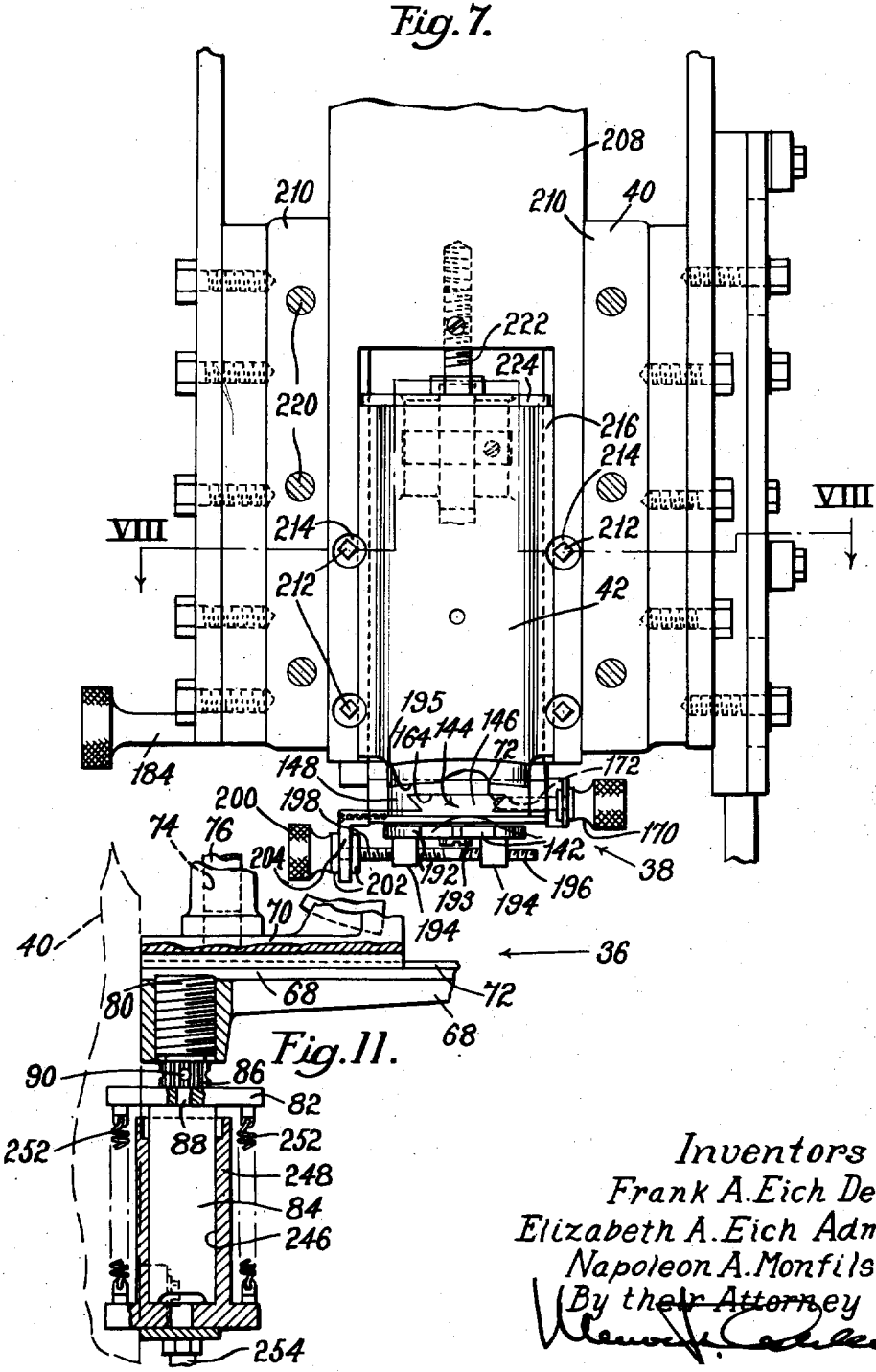

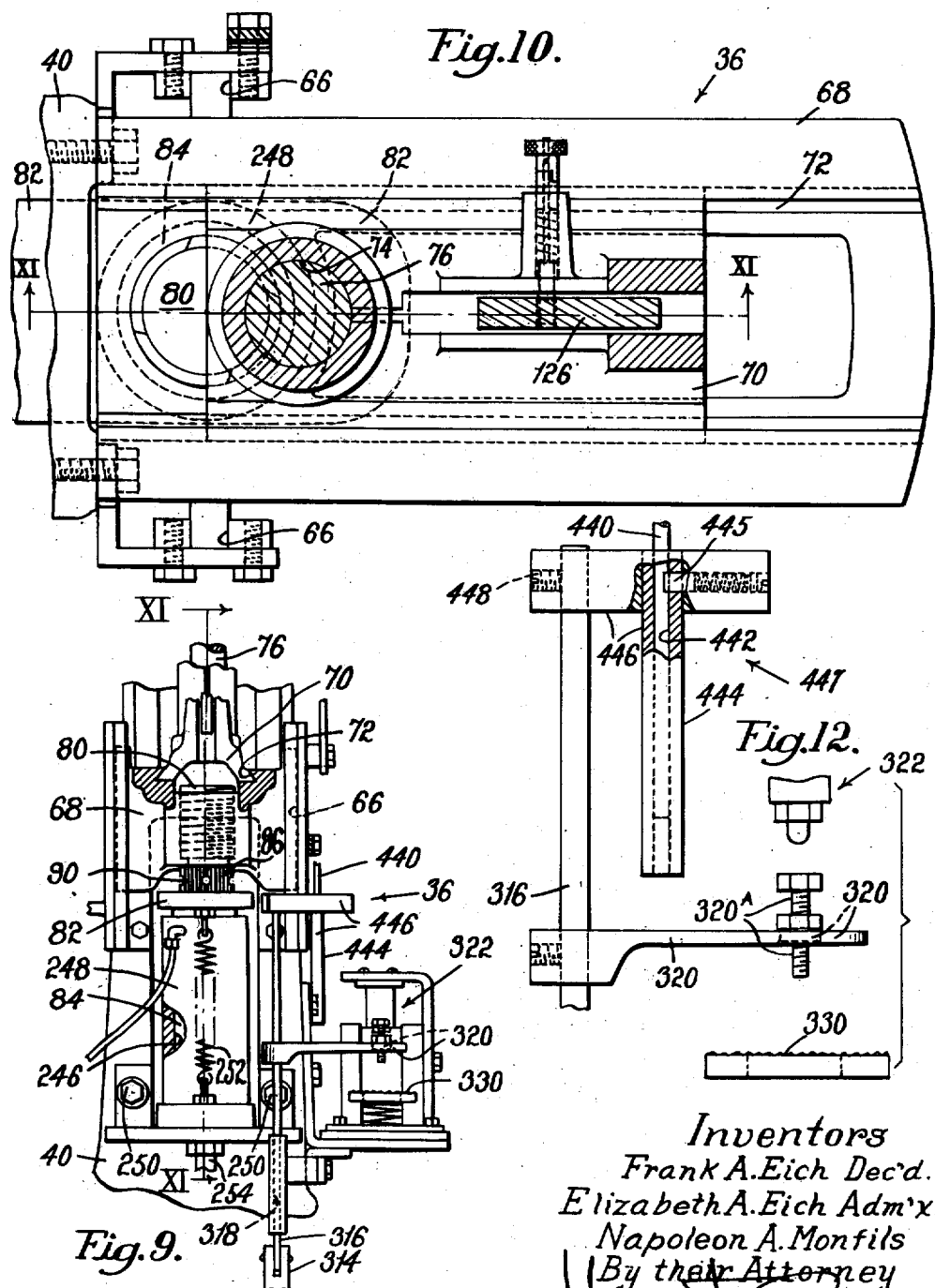

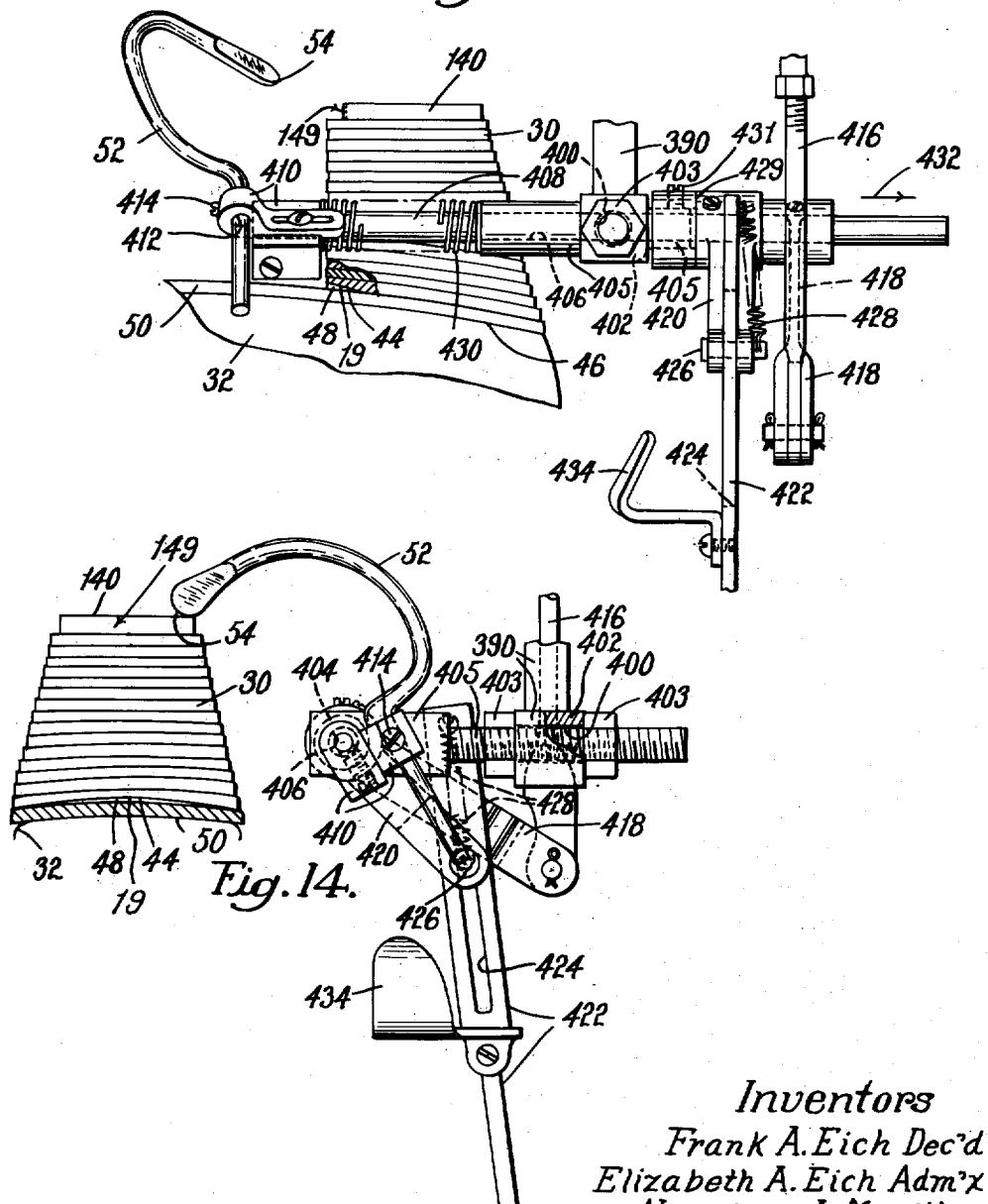

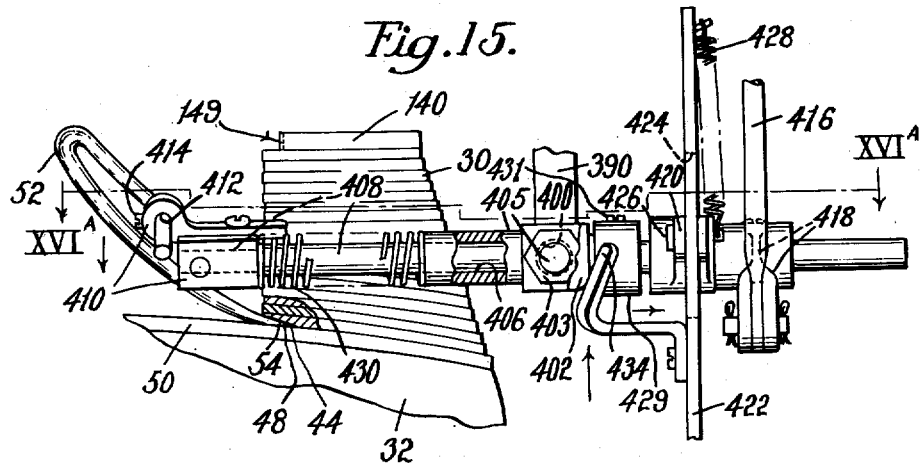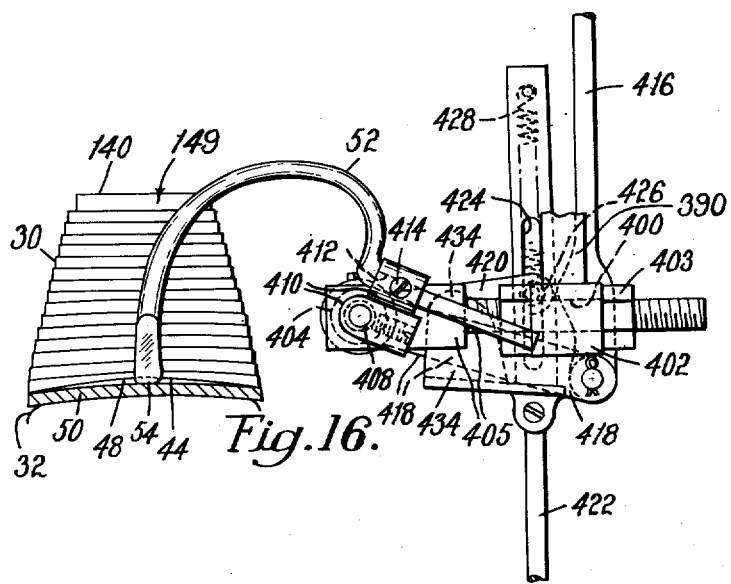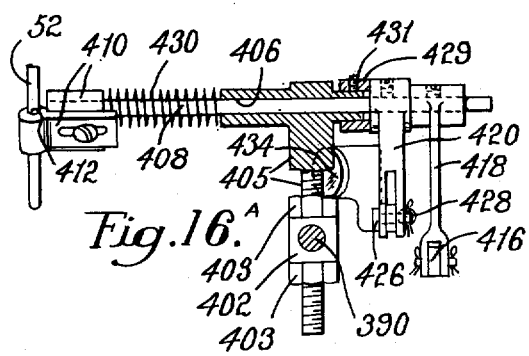

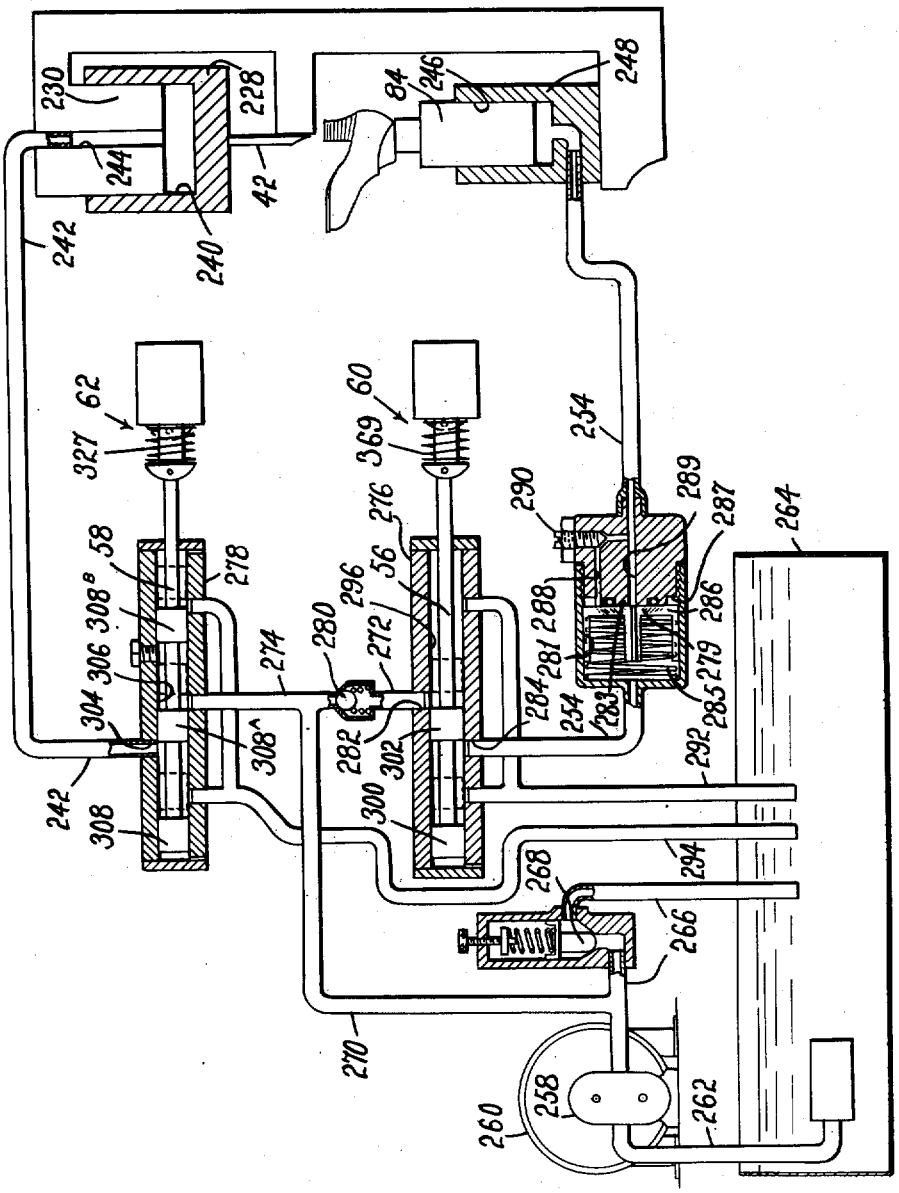

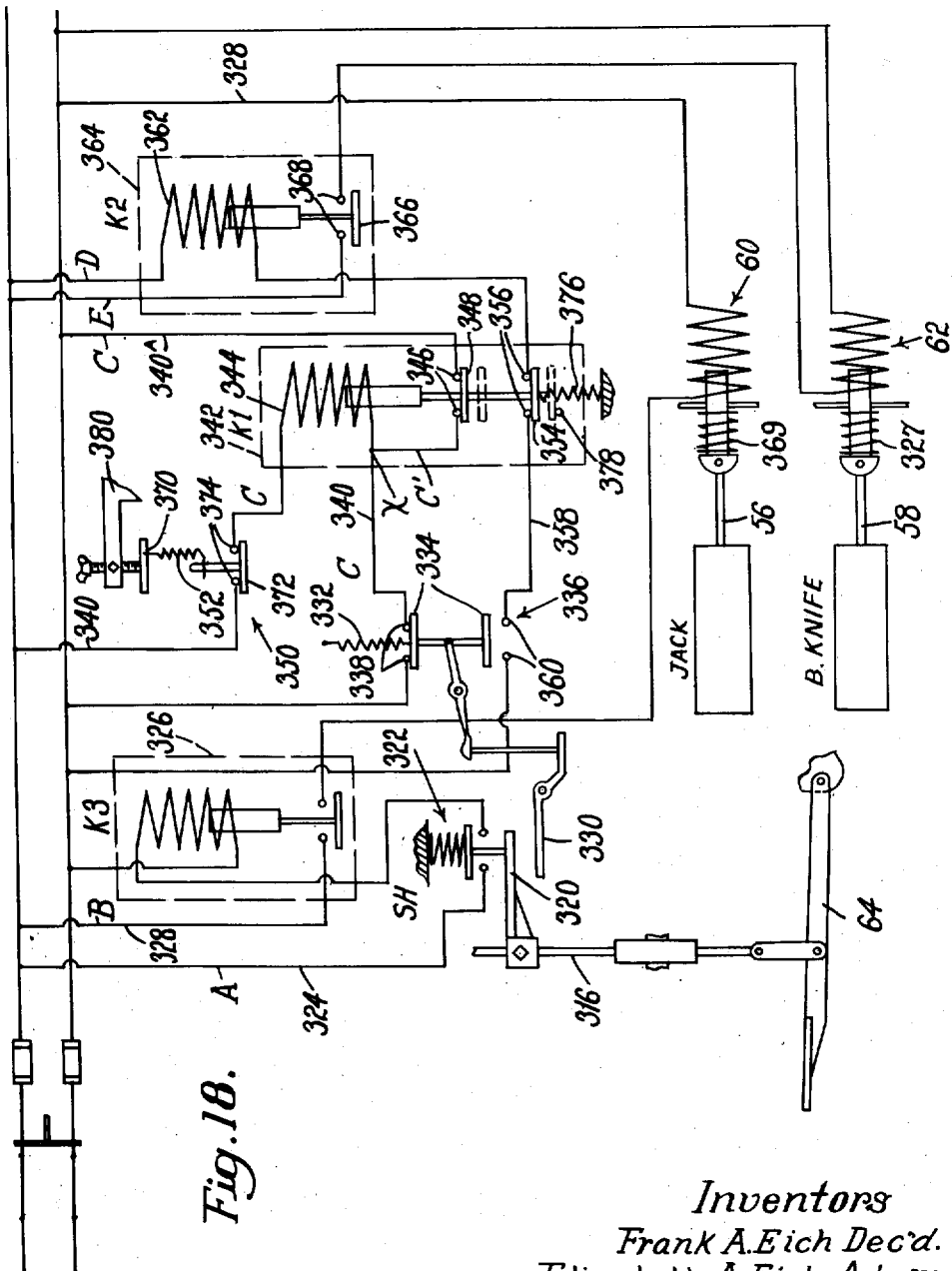

Inventors
Frank A. Eich Dec'd.
Elizabeth A. Eich Admx.
Napoleon A. Monfils
By their Attorney Patented Dec. 19, 1950

2,534,343

UNITED STATES PATENT OFFICE 2,534,343

HEEL-BREASTING MACHINE

Frank A. Eich, deceased, late of Melrose, Mass., by Elizabeth A. Eich, administratrix, Melrose, Mass., and Napoleon A. Monfils, Haverhill, Mass., assignors to United Shoe Machinery Corporation, Flemington, N. J., a corporation of New Jersey Application July 28, 1949, Serial No. 107,154

21 Claims. (Cl. 12—47)

This invention relates to machines for breasting attached heels of shoes, it being an object of the invention to provide an improved machine of the general type disclosed in United States Letters Patent No. 2,385,482, granted September 25, 1945, on an application filed in the name of Erastus E. Winkley.

The present invention consists in the novel features hereinafter described, reference being had to the accompanying drawings which illustrate one embodiment of the invention, selected for the purpose of illustration, the invention being fully disclosed in the following description and claims.

In the drawings,

Figs. 1 and 1A are views, partly broken away, of upper and lower portions, respectively, of one side of an illustrative heel breasting machine;

Figs. 2 and 2A are views corresponding to views 1 and 1A, respectively, showing upper and lower portions of the opposite side of the machine;

Fig. 2B is a view on the line IIB—IIB of Fig. 2;

Fig. 3 is a section on the line III—III of Fig. 1 showing details of a jack of the machine;

Fig. 4 is an enlarged side elevation, partly broken away, showing an abutment which is engaged by the thread ends of attached heels of shoes operated upon by the machine;

Fig. 5 is a plan view of the abutment illustrated in Fig. 4;

Fig. 6 is a bottom view, partly in phantom lines, of said abutment;

Fig. 7 is a front view, partly broken away, showing the abutment illustrated in Figs. 4, 5 and 6 and portions of a breasting knife and a carrier for the knife;

Fig. 8 is a section on line VIII—VIII of Fig. 7 showing details of the breasting knife and its carrier;

Fig. 9 is a front view, partly in section, of lower portions of the machine;

Fig. 10 is a view on line X—X of Fig. 2A;

Fig. 11 is a view partly in section on line XI—XI of Fig. 9;

Fig. 12 is a side view, partly in section, of a friction clutch operatively connected to a treadle of the machine;

Figs. 13 and 14 are side and front views, respectively, illustrating shoe position testing mechanism of the machine when the machine is at rest;

Figs. 15 and 16 are side and front views corresponding to Figs. 13 and 14, respectively, showing the shoe position testing mechanism in operative position;

Fig. 16A is a view on line XVIA—XVIA of Fig. 15;

Fig. 17 is an illustrative view showing fluid pressure means of the machine for operating in sequence the jack and the breasting knife;

Fig. 18 is a wiring diagram showing the various treadle controlled circuits for effecting actuation of the fluid pressure means;

Figure 19:
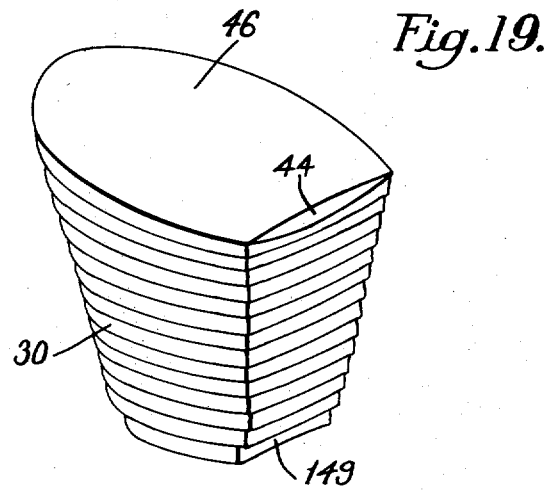
Fig. 19 is a perspective view of a built-up leather heel prior to its attachment to a shoe.
Figure 20:
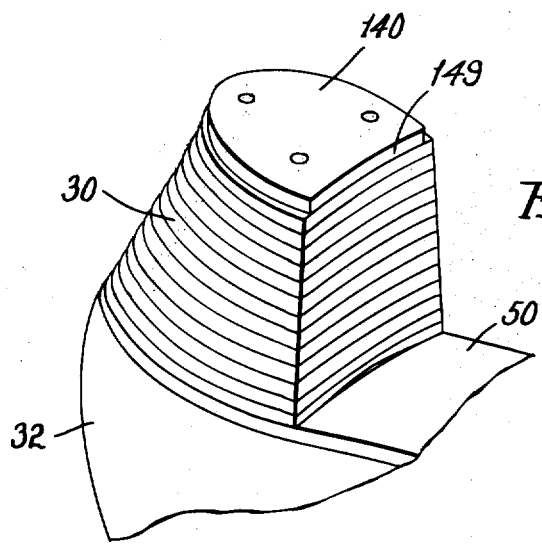
Fig. 20 shows in perspective the rear end of a shoe having an attached heel, after the heel has been breasted by the use of the illustrated machine.

The illustrative machine is described with reference to breasting a built leather heel 30 attached to a shoe 32 mounted upon a last 34 (Figs. 1 and 2) and comprises a work support or jack 36 upon which the shoe, arranged bottom up, is mounted, and an abutment 38 which is adjustably secured to a main frame 40 of the machine and against which the tread end of the heel of the shoe is forced upon upward movement of the jack preparatory to lowering a knife 42 (Figs. 1, 2, 7, 8 and 17), vertically reciprocable in the main frame, to breast the heel.

The illustrative unbreasted heel 30 (Fig. 19) has (at the forward end of its attaching face 46) a scallop 44 which is formed by the use of a mold of the general type disclosed in United States Letters Patent No. 364,217, granted June 7, 1887, on an application filed in the name of Gilbert R. Coburn. When the unbreasted heel 30 is attached to the shoe 32 a slight recess or crease 48, shown exaggerated for purposes of illustration, is formed between an outsole 50 of the shoe and the forward median portion of the attaching face 46 of the heel, said recess insuring that the shank portion of the outsole shall not be marked during the heel-attaching operation by pressure of the heel against it. The heel-breasting cut commonly extends through the rear end of the scallop 44 and accordingly there is little evidence of such scallop after the heel-breasting operation.

As will be explained later, the illustrative machine is provided with a testing gage or feeler 52 (Figs. 1, 2, 13, 14, 15 and 16) having a thin tapered end or tip 54 which, preparatory to breasting the heel 30, is positioned in the recess 48. As stated in said Patent No. 2,385,482, in breasting the heel 30 it is desirable that the breasting stroke of the knife 42 shall cut to, but not substantially into, the outsole 50 of the shoe 32. In the present machine, as in the machine disclosed in said Patent No. 2,385,482, the knife 42, in making its breasting cut, passes the end or tip 54 of the gage 52, which, through suitable mechanism hereinafter described, registers or tests the position of the work in the machine and insures that downward movement of the knife shall cease after said knife has completely cut through the heel 30 and before it has cut substantially into the outsole 50.

As will be explained later, the jack 36 and the breasting knife 42 are operated by fluid-pressure means rendered effective or active and ineffective or inactive by the operation of valves or plungers 56, 58 (Figs. 17 and 18) which are actuated by electric means comprising solenoids 60, 62, respectively, responsive to depression of a treadle 64, the construction and arrangement being such that initial downward movement of the treadle causes upward movement of the jack 36 to force the tread end of the unbreasted heel 30 of the shoe 32 mounted upon the jack against the initially adjusted abutment 38, further depression of the treadle causing the knife 42 to move downward to breast the heel.

The main frame 40 of the machine is bolted or otherwise secured to the floor and has vertical guideways 66 (Figs. 1A, 9 and 10) along which a ledge 68 of the jack 36 is slidable, said frame comprising an overhanging head upon which is mounted mechanism for moving and controlling the extent of movement of the breasting knife 42. The jack 36 comprises a slide 70 which is movable forward and rearward in dovetail guideways 72 of the ledge 68, said slide having formed integral with it a boss having a cylindrical bore 74 for receiving a post 76 provided with a threaded portion upon which a nut 78 (Figs. 1A and 2A) is rotatable to adjust the height of the post, said nut resting upon the boss. The ledge 68 has a depending boss into which is threaded a screw 80, supported upon a header 82 of a hydraulically operated piston 84 (Figs. 9, 11 and 17), and having formed integral with it a collar 86 and a depending pin 88 (Fig. 11) which fits in a recess of the header. The collar 86 is provided with a plurality of holes 90 for receiving a manually actuated tool (not shown) for rotating the screw 80 in order to raise or lower the ledge 68 with relation to the piston 84 and accordingly initially to move the jack 36 to the proper heightwise position to accommodate the particular style and/or size of shoe to be breasted.

Swiveled for angular adjustment in a semicylindrical recess 92 (Figs. 1 and 2) of the post 76 is a platform 94, an arcuate toothed portion 96 (Figs. 2, 2A and 3) of which extends through a slot 98 (Fig. 3) in the post. A pinion 100 is mounted for rotation in a bore 102 of the post 76 and meshes with the arcuate toothed portion 96 which is centered about the axis of the semicylindrical recess 92. Secured to a projecting shank of the pinion 100 is a cap 104 and surrounding said shank and housed in a recess 106 of the post 76 is a spring 108 which constantly urges the pinion 100 to a locked position in which one of a plurality of holes 110 in an adjusting plate 112 (Figs. 1, 1A and 3) formed integral with the pinion receives a pin 114 carried by the post. The platform 94 may be readily adjusted about the axis of the semi-cylindrical recess 92 by manually gripping the adjusting plate 112 of the pinion 100 and sliding said pinion to the right, as viewed in Fig. 3, against the action of the spring 108, the pinion then being rotated to the desired position angularly to adjust said platform. The adjusting plate 112, and accordingly the pinion 100, is then released, and is moved by the action of the spring 108 to its locked position in which the pin 114 occupies one of the holes 110. The platform 94 has a transversely disposed dovetail slot 116 (Figs. 1 and 2) in which fits slidingly a tongue of a block 118 having a last pin 120 and also having a face 122 constructed and arranged to be engaged by the cone of the last 34 upon which the shoe is mounted.

Supported upon an upstanding lug of the slide 70 is a pin 124 (Figs. 1A and 2A) upon which is swiveled a column 126 having a bore 128 for receiving a threaded portion of a resilient toe rest 130, a nut 132 which rests upon said column being threaded onto the toe rest and being rotatable to vary the heightwise operating position of the toe rest. The toe rest 130 may be swung into different adjusted positions about the axis of the pin 124 after withdrawing from one of a plurality of openings 134 in a depending angular extension of the column 126 a stud 136 slidingly fitting in an opening in the jack slide 70, said stud being inserted in another opening 134 in said extension of the column after the toe rest has been suitably adjusted.

The jack 36 can be moved manually along the longitudinal guideways 72 formed in the ledge 68, the shoe 32, which is mounted upon the last 34 and is to be presented to the machine, being placed upon the jack when the jack is in its forward, or loading and unloading position. After the operator has mounted the work upon the jack 36 and has moved the jack rearward along the longitudinal guideways 72, he depresses the treadle 64, causing, through mechanism which will be hereinafter described, the raising of the ledge 68 along the vertically disposed guideways 66, the jack being manually moved forward and rearward to slight extents as it is raised into a position in which the rear end of a prefinished toplift 140 of the heel 30 engages an initially positioned back gage 142 carried by the abutment 38 just before the tread end of the shoe is forced by upward movement of the jack against said abutment. The back gage 142 is initially adjusted forward or rearward in the machine for a particular size and style of shoe to be operated upon, the gage being so arranged that when the rear end of the toplift 140 of the heel 30 engages the gage, the shoe 32 is so positioned that when the breasting knife 42 moves downward past a front, concave face 144 of an insert 146 of the abutment 38, it will pass along a breast 149 of the toplift 140 and continue to move downward at the proper angle, correctly to breast the heel.

The abutment 38 comprises a housing 148 formed integral with a guide plate 150, (Figs. 2 and 8), initially adjustable in a vertical guideway 152 of a bearing 154 of the main frame 40 and having pivotally connected to it a forward end of a lever 156 fulcrumed on a bearing rod 158 (Figs. 1 and 2) secured to the main frame. The rear end of the lever 156 is pivotally connected to the upper end of a rod 160 secured to the main frame 40 by nuts 162.

In order to accommodate different styles of heels, inserts 146 (Figs. 2, 4, 5, 6 and 7) having differently shaped front faces 144 may be quickly substituted for one another. Each of the inserts 146 has a dovetail portion constructed and arranged to fit in a complementary shaped recess 164 of the housing 148. A carrier plate 166 is movable into different forward and rearward adjusted positions along an elongated guideway 168

(Fig. 4) which is formed in the housing 148 and is continuous with the recess 164. The insert 146 is held in its operating position in the housing 148 by a spring-pressed retaining plunger 170 which extends through a bore 172 (Figs. 5 and 7) in the housing and enters a recess 174 of the insert. The carrier plate 166 upon which the back gage 142 is mounted is adjustable along the guideway 168 (Fig. 4) of the housing 148 of the abutment 38 and has an upstanding boss 176 extending through a slot 178 (Fig. 5) in the housing. Secured by screws 180 to the housing 148 is a bracket 182 in which is rotatably mounted a manually operated shaft 184 to the inner end of which is secured a skew gear 186 meshing with a skew gear 187 (Fig. 4) forming part of a screw 188 rotatable in the bracket and meshing with an internally threaded portion of the boss 176 of the carrier plate 166.

In a machine of the general type disclosed herein, it is common practice for the operator to aline the breast 149 of the prefinished toplift 140 of the unbreasted heel 30 with the front face 144 of the insert 146 which face forms a continuous face with the front face of the housing 148. In order to expedite the positioning of shoes in the machine, especially when such shoes are of the same size and style, there is provided the above-mentioned back gage 142, which comprises arms 192 the tips of which are constructed and arranged to be engaged by the rear portion of the toplift 140 of the heel 30 as shown in Fig. 6 to position the heel lengthwise and widthwise with relation to the path of movement of a cutting edge 195 of the knife 42. As best illustrated in Fig. 7, the cutting edge 195 of the knife 42 is concave transversely to the same extent as the front face 144 of the insert 146 is concave transversely, said cutting edge also being slightly concave heightwise. The arms 192 of the gage 142 are mounted upon a pivot pin 193 secured to the carrier plate 166, and have pivotally mounted on their rear ends blocks 194 provided with threaded bores which mesh with right and left-hand threaded portions 196, 198 (Figs. 6 and 7) of a screw 200. The screw 200 has flanges 202 which straddle a depending flange 204 of the carrier plate 148 and a shank fitting in an elongated slot 206 (Fig. 4) in said flange, the screw being moved along the slot when the carrier plate 166 is adjusted in the housing 148. The back gage 142 may be quickly and effectively adjusted lengthwise to its proper operating position by rotating the shaft 184 and the arms 192 of said gage may be swung into their proper angularly adjusted positions upon the carrier plate 166 by rotating the screw 200.

The knife 42 is secured to a knife carrier 208, (Figs. 1, 2, 7 and 8), which is mounted for vertical movement between guide portions 210 of the main frame 40, by four screws 212 threaded into the carrier and having collars 214 clamped against lateral flanges 216 of the knife, portions of the knife and its carrier being normally covered by a plate 218 (Figs. 1, 2 and 8) secured to the guide portions of tthe main frame by screws 220. In order to insure that the knife 42 shall not be displaced from its adjusted position upon its carrier 208 during the heel-breasting operation, there is threaded into the carrier a stop screw 222 (Figs. 2 and 7) a head of which during the setting up operation is forced against a plate 224 in engagement with the upper end of the knife.

The knife carrier 208 is secured by bolts 226 (Figs. 1 and 2) to an oil housing 228 which is slidingly mounted on a bearing cylinder 230 fastened by screws 232 to the main frame 40 and is constantly urged upward by springs 234 the upper ends of which are attached to the main frame and the lower ends of which are attached to the housing. Upward movement of the housing 228 is limited by the engagement of a screw 236 adjustably secured to said housing with a face 238 of the main frame 40.

As will be explained later, oil is supplied to a chamber 240 (Figs. 2 and 17) formed between the housing 228 and the bearing cylinder 230 through a pipe 242 and a vertical passage 244 in the bearing cylinder to force said housing, and accordingly the breasting knife 42, downward against the action of the springs 234.

The piston 84 (Figs. 9, 11 and 17), which raises the jack 36 to effect clamping of the unbreasted heel of the shoe against the abutment 38, is vertically slidable in a cylindrical chamber 246 of an oil housing 248 secured by screws 250 (Figs. 2A and 9) to the main frame 40. Attached to the header 82, which is formed integral with the piston 84, are springs 252 the lower ends of which are attached to the oil housing 248, said springs serving to move the piston 84 to its lowered or retracted position against the bottom of the chamber 246. Oil is supplied to the chamber 246 by a pipe 254 connected to a source of fluid pressure, as will be explained later.

Secured to the main frame 40 is a table 256 (Figs. 1A and 2A) upon which are mounted various oil pressure supplying and controlling units hereinafter described. Oil is supplied under pressure by a rotary pump 258 (Figs. 2A and 17) which is operated by an electric motor 260 and receives oil from a pipe 262 the lower end of which is immersed in oil in a container or sump 264. When the machine is idle, high pressure oil from the pump 258 passes through a sump pipe 266 between portions of which is included a spring-controlled pressure valve 268. Connected to the pipe 266 is a pipe 270 which supplies oil to branches 272, 274 extending into the jack and knife-operating valve or plunger housings 276, 278, respectively, the branch 272 having formed in it a spring-pressed check valve 280. The valve or plunger housing 276 has formed in it inlet and outlet ports 282, 284, connected to the branch 272 and to the oil pipe 254, respectively. Arranged in the oil pipe 254 is a control valve 286 (Figs. 2 and 17) comprising a spring-pressed plunger 279 (Fig. 17) having a noncylindrical head which is slidable in a cylindrical recess 281 and is normally forced against a face 283 of the valve by a spring 285. High-pressure oil entering the cylindrical recess 281 through the pipe 254 passes around the head of the plunger 279 into an annular recess 287, through a passage 288 and into an outer portion of the pipe 254. Arranged in the passage 288 is a screw 290 which may be adjusted to restrict the flow of oil in the passage 288 thereby insuring that the jack shall not rise too fast, and thus allowing the operator sufficient time in which to position the work in the machine. After the heel breasting operation, oil from the chamber 246 in addition to moving back through the passage 288, passes into a passage 289 in the control valve 286, thus displacing the plunger 279 against the action of the spring 285, and into the cylindrical recess 281.

Also connected to the valve housings 276, 278 are pipes 292, 294 leading to the oil sump 264. The valve housing 276 has slidable in a cylindrical chamber 296 thereof the plunger 56 which has cylindrical heads 300, 302, said heads, when the plunger is in its idle position shown in Fig. 17, being arranged to cut off the branch 272 from the pipe 254, oil which flows into the chamber 296 being allowed to drain into the sump 264 through the pipe 292. When the plunger 56 is in its dash-line operating position shown in Fig. 17, after the solenoid 60 has been energized, high-pressure oil entering the valve 296 through the branch pipe 272 flows through the pipe 254 into the cylindrical chamber 246 of the oil housing 248, causing upward movement of the piston 84, and accordingly elevation of the jack 36, to force the tread end of the heel 30 with clamping pressure against the abutment 36.

The valve housing 278 has a port 304 into which is threaded the pipe 242 connected to the passage 244 in the bearing cylinder 230. As will be hereinafter explained, after the work has been properly clamped in place in the machine and upon continued depression of the treadle 64, the solenoid 62 is energized, with the result that the plunger 58, which is slidable in a cylindrical chamber 306 of the housing 278, is moved to its dash line position shown in Fig. 17. The plunger 58 has three cylindrical heads 308, 308A, and 308B constructed and arranged slidingly to fit in the cylindrical chamber 306, said plunger when in its full-line idle position illustrated in Fig. 17 allowing high-pressure oil to enter the chamber 306 between the heads 308A and 308B, oil being pocketed in said chamber and equal pressure being exerted in opposite directions against said heads. When the solenoid 62 is energized and the plunger 58 has been moved to its dash-line position shown in Fig. 17, oil enters the chamber 306 through the pipe 274, between the heads 308 and 308A and flows through the pipe 242 and the passage 244 into the chamber 240 of the housing 228, causing depression of the housing 228 upon the bearing cylinder 230 to operate the breasting knife 42.

The mechanism for energizing the solenoids 60, 62, which control the valves or plungers 56, 58, respectively, will now be described. The foot treadle 64 is pivoted upon a rod 310 (Figs. 1A and 2A) supported by the main frame 40 and is constantly urged upwardly by a spring 312. Operatively connected to the treadle 64, through a link 314, (Figs. 1A, 2A and 9) is a vertical rod 316, guided in a bore 318 of a boss of the main frame. The rod 316 has secured to it an arm 320 (Figs. 1A, 9, 12 and 18) which, when the machine is at rest, engages a normally closed microswitch 322, thus opening a circuit 324 and causing a relay 326 to be deenergized, with the result that a circuit 328 is opened and the solenoid 60 is deenergized, the plunger or valve 56 at such time being held in its full-line idle position illustrated in Fig. 17 by a spring 327. When the treadle 64 is depressed the arm 320 moves away from the normally closed microswitch 322, said switch closing and thus energizing the relay 326 which establishes the circuit 328 and accordingly energizes the solenoid 60 thereby moving the plunger 56 to its open dash-line position (Fig. 17) to admit high-pressure oil to the chamber 246 for actuating the jack-actuating piston 84.

As above stated, the operator slides the jack 36 upon which the shoe is mounted rearward along the dovetail guideways 72 of the ledge 68 as the jack is raised, the rear end of the toplift 140 of the attached heel 30 of the shoe 32 being moved into engagement with the back gage 142, thus insuring that the heel shall be correctly positioned with relation to the path of movement of the knife 42. During continued elevation of the jack 36 the toplift 140 of the unbreasted heel 30 of the shoe 32 is forced with heavy pressure against the insert 146 of the abutment 38. If the shoe 32 is not positioned in the machine to the satisfaction of the operator, he may at this stage of the operation remove his foot from the treadle 64, causing the microswitch 322 to be opened and the plunger 56 in the housing 276 to be moved back to its full-line position shown in Fig. 17, oil in the pipe 254 being spilled and the jack 36 being depressed by the action of the springs 252. The treadle 64 is then again depressed, the work being properly positioned before it is clamped in the machine.

Spaced from and below the microswitch 322 is a lever 330 (Figs. 1A, 9 and 18) which is normally held by a spring 332 (Fig. 18) in a raised position causing a control bar 334 of a two-way switch 336 to be held across terminals 338 of a split circuit 340, 340A, including a relay 342 having a coil 344, a pair of terminals 346 and a contact bar 348. Also included in the circuit 340, 340A is a knife limit microswitch 350 which is normally held closed by a spring 352 and may be referred to as an abutment. When the lever 330 is held in its raised position by the action of the spring 332 the relay 342 is energized as shown in Fig. 18, the contact bar 348 bridging the terminals 346 of the relay and another contact bar 354 formed integral with the bar 348 bridging terminals 356 of a circuit 358.

After clamping the work in the machine the operator further depresses the treadle 64, causing a screw 320A forming part of the arm 320 to be lowered against the action of the spring 332 and the lever 330 to be depressed, with the result that the bar 334 leaves the terminals 338 of the circuit 340 and connects terminals 360 of the two-way switch 336. Such action results in energizing a coil 362 of a relay 364 and causes the contact bar 366 of said relay to bridge terminals 368, thereby energizing the solenoid 62 which is connected to the plunger 58, thus causing said plunger to be moved to its dash-line position (Fig. 17). When the plunger 58 is thus positioned, high-pressure oil is admitted to the chamber 240 to cause the housing 228 and accordingly the breasting knife 42 to be lowered in a fixed path. When the solenoid 62 is deenergized the plunger 58 is moved to and is held in its full-line position shown in Fig. 17 by a spring 369.

When the breasting knife 42 has been moved downward a predetermined distance determined by the setting of the gage or testing member 52, a disk 370 (Figs. 1, 2 and 18), which is movable with the housing 228, engages a contact bar 372 of the microswitch 350, moving it away from terminals 374 and thus deenergizing the relay 342, with the result that the contact bars 348, 354 move under the action of a spring 376 to dash-line positions (Fig. 18) against a stop 378, opening the terminals 346, 356. Such action causes the plunger-operating solenoid 62 to be deenergized, with the result that the plunger 58 moves back to its full-line position illustrated in Fig. 17, and oil is spilled from the pipe 242 into the sump 264, downward movement of the knife ceasing. As soon as the plunger 58 has been moved to its oil-dumping position, the springs 234 operate to raise the housing 228, together with the carrier 208 and the knife 42, to starting positions. It will be noted that when the circuit 350 is broken it cannot be reestablished until the lever 330 is moved upward through a recognizable distance sufficient to permit the bar 334 to move under the action of the spring 332 into contact with the terminals 338. It will thus be apparent that when the disk 370 leaves the microswitch 350, which is normally closed by the spring 352, the circuit 340, 340A will not be reestablished until the bar 334 bridges the terminals 338, thereby making it necessary for the operator to permit a substantial raising of the treadle 64 under the action of the spring 312 and thereafter to depress the treadle sufficient to move the bar 334 back into contact with the terminals 380 before hydraulic pressure may again be rendered effective to drive the heel-breasting knife 42 downward.

The disk 370 has a shank which is threaded into a bracket 380, secured by screws 382 (Figs. 1 and 2) to the housing 228, and is secured in adjusted position to the bracket by a wing nut 384. The microswitch 350 is mounted on top of a slide 386 movable in a vertical guideway 388 (Figs. 1 and 2B) of a bracket 390 secured to and forming part of the main frame 40, said slide having a rack 392 in driving relation with a gear 394 rotatably mounted in the bracket. Also mounted for vertical reciprocation in a vertical guideway 396 (Fig. 2B) of the bracket 390 is a rack 398 in driving relation with the gear 394.

Secured by nuts 403 (Figs. 13, 14, 15, 16 and 16A) in a bore 400 of a head 402 of the bracket 390 is a guide block 405 in which is formed a forward and rearward projecting passage 406. Slidingly supported in the passage 406 is a horizontal shaft 408 to the forward end of which is pinned a holder 410 having a transverse bore 412 for receiving the gage 52 which may be set in different adjusted positions in the bore of the holder by a screw 414.

The lower end of the rack 398 is operatively connected by an adjustable rod 416 to an arm 418 screwed to the shaft 408, and screwed to said shaft in front of said arm is an arm 420, the outer end of which is bifurcated for receiving the upper end of an actuator bar 422. The actuator bar 422 has formed in its upper portion a slot 424 through which passes a stud 426 which is carried by the arm 420 and has attached to it a spring 428, the upper end of said spring being attached to the upper end of the bar 422. The shaft 408 is constantly forced forward in the bore 400 of the head 402 by a coil spring 430 which surrounds the shaft and has it front and rear ends in engagement with the holder 410 and the guide block 405, forward movement of the shaft being limited by the engagement of the boss of the arm 420 with a collar 429 (Figs. 13, 15 and 16A) which is adjustably secured by a screw 431 to the guide block 405.

It will be apparent that upward movement of the actuator bar 422 will effect, through the spring 428, counterclockwise movement, as viewed from the front of the machine (Figs. 14 and 16), of the shaft 408, and accordingly movement of the end or tip 54 of the sickle-shaped gage 52 against the shank of the outsole 50 of the shoe 32, the arrangement being such that the tip of the gage engages said shank just forward of the unbreasted heel 30 clamped in the machine.

In order that the tip 54 of the gage 52 shall be be moved into the recess or crease 48 formed between the outsole 50 and the scallop 44 of the attaching face 46 of the heel 30, it is desirable to move the gage rearward along the shank of the outsole 50 of the shoe after it has been moved into forced engagement with said shank. Such movement of the gage 52 is effected as a result of sliding the shaft 408 rearward in the bore 406 of the guide block 405 against the action of the spring 430 by forcing a cam 434 secured to the link 422 upward against the guide block as shown in Fig. 15.

The actuator bar 422 is universally connected to the rear end of a lever 436 (Figs. 1, 1A and 2A) pivoted on a bearing screw 438 threaded into the main frame 40. The forward end of the lever 436 has pivoted to it a vertical rod 440 (Figs. 1, 1A, 9 and 12) which extends into a vertical bore 442 (Fig. 12) of a sleeve 444 forming part of a block 446 attached by a screw 448 to the rod 316 to which the arm 320 is secured, the rod 440 being held in frictional binding relation with the block 446 by a spring-pressed slide 445. The block 446, together with the elements carried by it, serves as a friction clutch 447 for coupling the rods 316, 440 for downward movement together so long as the rod 440 can be moved, as will be explained later. It will be apparent from the foregoing that as the actuator bar 422 is raised upon depression of the treadle 64, the tip 54 of the gage 52 is yieldingly forced against the shank of the outsole 50 of the shoe, continued upward movement of the bar causing the gage to be forced against said shank with increased force, and the cam 434 to be forced against the block 405, with the result that the shaft 408, together with the gage 52, is moved rearward, the tip 54 of the gage entering the recess or crease 48 in the shoe. In order to stop upward movement of the bar 422 to limit rearward pressure of the gage 52 against the work, there is adjustably mounted upon the main frame a screw 450 (Fig. 1A) constructed and arranged to be engaged by the lever 436. Since the arm 418, which is secured to the shaft 408, is angularly displaced in timed relation with the slide 386 (Figs. 1, 2 and 2B) which carries the microswitch 350, it will be apparent that the position of the microswitch is dependent upon the position of the tip 54 of the gage 52. As above explained, the heel-breasting knife 42 cuts to a point just rearward of the tip 54 of the gage 52 and accordingly the gage effectively registers the exact height of the portion of the work to be cut so that the downward stopping point of the knife can be measured with precision.

As the treadle 64 is depressed, the arm 320 (Figs. 1A, 9, 12 and 18) moves downward away from the microswitch 322, causing, through mechanism above described, the hydraulically operated jack 36 which has been moved to its proper position beneath the abutment 38, to force the tread end of the heel against said abutment. Depression of the treadle 64 also effects, through mechanism comprising the friction clutch 447, the lowering of the rod 440, causing the bar 442 to be raised and the tip 54 of the gage 52 to be forced against the shank of the outsole 50 of the shoe 32. As the bar 442 continues to move downward upon continued depression of the treadle 64, the cam 434 forces the shaft 408, and accordingly the gage 52, rearward, the tip 54 of the gage entering the recess 48 of the shoe and downward movement of the bar ceasing. At this time the lever 436 will have rotated counterclockwise into substantial engagement with the stop screw 450 (Fig. 1A) which is initially adjusted by the operator.

When the work has been positioned and clamped in the machine, as well as measured as above described, the operator further depresses the treadle 64, causing the lever 330 to operate the two-way switch 336 with the result that hydraulic pressure is supplied to the chamber 240 to move the housing 228 and accordingly the breasting knife 42 downward to its lowered position determined by the engagement of the disk 370 with the microswitch 350.

The operator then removes his foot from the treadle 64 with the result that the various operative elements of the machine return to their idle positions, the jack 36 thereafter being slid manually forward preparatory to removing the shoe, the heel of which has been breasted, from the machine.

It will be understood that in operating on types of shoes not having the creases 48 formed between the shanks of the outsoles 50 of the shoes 32 and the forward ends of the attaching faces of the heels 30, the tip 54 of the gage is moved rearward along the shanks of the outsoles until said tip engages the upper ends of the breasts of the heels.

Having thus described our invention, what we claim as new and desire to secure by Letters Patent of the United States is:

1. In a heel breasting machine, a movable support for a shoe which has an unbreasted heel, an abutment constructed and arranged to be engaged by the tread end of the heel, hydraulically powered mechanism, electrically actuated valve controlled mechanism for rendering effective or ineffective the hydraulically powered mechanism, a breasting knife movable past said abutment, and means comprising a treadle movable from a predetermined position to render portions of the valve controlled mechanism operative thereby causing the hydraulically powered mechanism to actuate the support and thus to force the tread end of the unbreasted heel of the shoe mounted upon the support against the abutment, said means being movable to a second predetermined position to operate said electrically actuated valve controlled mechanism and accordingly other portions of said hydraulically powered mechanism to cause the breasting knife to be moved past said abutment to breast the heel.

2. In a heel breasting machine, a support for a shoe which is mounted upon a last and has a unbreasted heel, means comprising an abutment for positioning the shoe in the machine, a breasting knife movable past the abutment and heightwise of the heel of the positioned shoe to breast said heel, fluid pressure means for operating the shoe support and the knife, and manually operated mechanism for controlling the fluid pressure means, said mechanism being constructed and arranged first to actuate, through said fluid pressure means, the support to cause the tread end of the heel of the shoe to be forced against said abutment and thereafter to cause the knife the move heightwise of the heel to breast said heel.

3. In a heel breasting machine, a support for a shoe which is mounted upon a last and to which an unbreasted heel is attached, an abutment constructed and arranged to be engaged by the tread end of the heel of the shoe upon the support, a breasting knife movable heightwise of the heel past the abutment to breast said heel, fluid pressure means for operating the support and the knife, a valve for controlling portions of the fluid pressure means to effect operation of the support, a second valve for controlling other portions of the fluid pressure means to effect operation of the knife, solenoids for operating the valves, and manually actuated mechanism for operating in sequence the solenoids to effect successive operation of the first and second-named valves and accordingly movement of the support to clamp the shoe in the machine and thereafter to move the knife past the abutment and heightwise of the heel to breast said heel.

4. In a heel breasting machine, a movable support for a shoe which has an attached unbreasted heel, an abutment constructed and arranged to be engaged by the tread end of the heel of the shoe upon the support, hydraulically powered mechanism, a gage associated with the abutment for positioning the shoe upon the support widthwise and lengthwise with relation to the abutment, electrically actuated valve control mechanism for rendering effective and ineffective the hydraulically powered mechanism, a knife, and manually operated means movable from a predetermined position to render portions of the valve control means operative to cause the hydraulically operated mechanism to actuate the support to force the tread end of the unbreasted heel of the shoe upon the support against said abutment, said manually operated means being movable to a second predetermined position to cause the knife, through said electrically actuated valve control mechanism and hydraulically powered mechanism, to move past said abutment and heightwise of said heel to breast the heel.

5. In a heel breasting machine, means for clamping in a fixed operative position a shoe which has an attached unbreasted heel, a testing member, a breasting knife, means for moving said knife in a predetermined path to breast the heel, treadle operated means for moving said testing member heightwise and lengthwise of the shoe into engagement with the shank portion of the outsole and with the heel of the shoe, and means movable into different positions in accordance with the position of said testing member for limiting movement of the knife along said path.

6. In a heel breasting machine, means for clamping in a fixed position a shoe which is mounted upon a last and has attached to it an unbreasted heel, a testing member, treadle operated means for moving said member first generally heightwise of the positioned shoe with yielding pressure into engagement with the shank portion of an outsole of said shoe and then generally lengthwise of said outsole with yielding pressure against the heel of the shoe, a breasting knife, means for moving said knife to breast said heel, a member movable in response to movement of the testing member, and means responsive to engagement by said member for limiting movement of the knife.

7. In a heel breasting machine, means for clamping in a predetermined position a shoe comprising an outsole and an unbreasted heel, fluid pressure means for actuating said clamping means, a gage constructed and arranged to be moved into and out of a crease formed between the heel and the shank portion of the outsole of the shoe, a heel breasting knife, fluid pressure means for operating said knife to breast said heel, means for actuating said gage and said first and second-named fluid pressure means, and means operatively connected to said last-named fluid-pressure means and to said gage for varying the breasting stroke of the knife in accordance with the position of said gage.

8. In a heel breasting machine, means for clamping a shoe having an attached outsole and an attached unbreasted heel, a knife mounted for translatory movement in a path for breasting the heel of the shoe, a gage for testing the position of the forward end of the attaching face of the heel, manually actuated electrically controlled fluid-pressure means operatively connected to the knife, and a member which is set in different operative positions in accordance with the position of the gage and which is constructed and arranged to be engaged by said last-named means to limit movement of the knife in said path.

9. In a heel breasting machine, means for positioning and clamping a shoe having an attached outsole and an attached unbreasted heel, a knife mounted for translatory movement in a path for breasting the heel of the shoe, manually actuated electrically controlled fluid pressure means for moving said knife, a testing member, means for moving the testing member into engagement with the shank portion of the outsole of the shoe and then lengthwise along said outsole into engagement with the heel of the shoe, and elements operatively connected to the testing member and to the fluid pressure means respectively, one of said elements constituting a switch which is actuated upon engagement of said elements to cause movement of the knife in said path to be limited.

10. In a heel breasting machine, an abutment, a support for a shoe having an unbreasted heel, said support being manually movable lengthwise and widthwise of the shoe on the support to enable the operator to position the shoe in a predetermined position with its heel beneath said abutment, fluid pressure means for forcing the heel of the positioned shoe with substantial pressure against the abutment, a treadle, electrically controlled means responsive to movement of the treadle for rendering active said fluid pressure means to cause the heel of the shoe to be forced with considerable pressure against the abutment, and a knife movable past said abutment to breast the heel of the shoe thus positioned and clamped.

11. In a heel breasting machine, an abutment, a support for a shoe which has attached to it an outsole and an unbreasted heel, said support being manually movable lengthwise and widthwise of the shoe to enable the operator to position the heel of the shoe on the support in a predetermined position beneath the abutment, fluid pressure means, a treadle, electrically controlled means responsive to movement of the treadle for rendering active said fluid pressure means to cause the heel of the shoe thus positioned to be forced with heavy pressure against the abutment, a breasting knife movable in a predetermined path past the abutment, fluid pressure means for operating said knife in said path, and electrically controlled means responsive to movement of the treadle for rendering the knife operating fluid pressure means effective to cause the knife to breast the heel.

12. In a heel breasting machine, an abutment, a support for a shoe which has attached to it an outsole and an unbreasted heel, said support being manually movable lengthwise and widthwise of the shoe to enable the operator to position the heel of the shoe on the support in a predetermined position beneath the abutment, fluid pressure means, a treadle, electrically controlled means responsive to movement of the treadle for rendering operative said fluid pressure means to cause the heel of the shoe thus positioned to be forced with heavy pressure against the abutment, a testing member constructed and arranged to engage the shank portion of the outsole of the shoe, said testing member being movable in response to movement of the treadle, a breasting knife movable in a predetermined path past said abutment to breast the heel thus clamped, fluid pressure means for operating said knife in said path, electrically controlled means responsive to movement of the treadle for rendering the knife operating fluid pressure means effective to cause the knife to breast the heel, a switch movable into different operative positions in accordance with the setting of the testing member, and an element operatively connected to the knife and constructed and arranged to engage the switch to render said knife operating fluid pressure means ineffective thereby limiting movement of the breasting knife in said path.

13. In a heel breasting machine, means for positioning and clamping a shoe, a gage which is movable in two directions disposed at approximately right angles to each other and is constructed and arranged to occupy a crease formed between an outsole of the shoe and the forward end of the attaching face of an unbreasted heel of said shoe, a breasting knife mounted for translatory movement in a path, means for operating said knife along said path, a treadle operatively connected to and constructed and arranged to actuate in succession the positioning and clamping means to secure the shoe in the proper position to be operated upon, the gage in said two different directions to cause the gage to occupy said crease and the knife operating means to trim material from the breast of the heel, and means comprising a member movable into different positions in accordance with the position of the gage for limiting movement of the breasting knife in said path.

14. In a heel breasting machine, means for positioning and clamping a shoe, a gage constructed and arranged to occupy a crease formed between an outsole of the shoe and the forward end of the attaching face of an unbreasted heel of said shoe, treadle operated means for moving the gage first into engagement with the shank portion of the outsole of the shoe and thereafter rearwardly along said outsole and into the crease, a breasting knife mounted for translatory movement in a path, means for operating said knife to breast the heel positioned and clamped in the machine, and means operatively connected to the gage for limiting travel of the knife in said path in accordance with the position of said gage.

15. In a heel breasting machine, means for positioning and clamping a shoe, a position testing member constructed and arranged to occupy a crease formed between an outsole of the shoe and the forward end of the attaching face of an unbreasted heel of the shoe, means for yieldingly forcing the gage against the shank portion of the outsole and thereafter yieldingly moving the gage along the outsole and into said crease, a knife mounted for translatory movement in a path to breast the heel, and means comprising an abutment movable into different positions in accordance with the positions of the gage for limiting movement of the breasting knife along said path.

16. In a heel breasting machine, an abutment, a support for a shoe, fluid pressure means for actuating said support to force an attached unbreasted heel of the shoe mounted upon the support against said abutment, said fluid pressure means comprising a control valve for restricting flow of fluid in order slowly to move the support to enable an operator to position the shoe lengthwise and widthwise as the shoe and the support are moved toward the abutment, a knife mounted for translatory movement in a path to breast the heel of the shoe, fluid pressure means for operating the knife, and means comprising a treadle for operating in succession the first and second named fluid pressure means.

17. In a heel breasting machine, means for positioning and clamping a shoe, a testing member constructed and arranged to engage in a crease formed between an attached heel and an outsole of the shoe, and mechanism comprising a treadle operatively connected to the testing member, said mechanism being constructed and arranged in response to movement of the treadle yieldingly to move the testing member heightwise of the shoe into engagement with the outsole of the shoe and then along said outsole yieldingly into the crease.

18. In a heel breasting machine, means for positioning and clamping a shoe, a testing member constructed and arranged to engage in a crease formed between an attached heel and an outsole of the shoe, and mechanism comprising a treadle and a shaft operatively connected to the testing member, said mechanism being constructed and arranged, in response to movement of the treadle, yieldingly to rotate the shaft to move said member against the outsole and then yieldingly to move the shaft lengthwise to move said testing member along the outsole and into the crease.

19. In a heel breasting machine, means for supporting a shoe, a heel breasting knife mounted for reciprocation, fluid pressure means for operating the knife, a shoe positioning gage having a tip constructed and arranged to be positioned approximately in the path of reciprocation of the knife, and means operatively associated with the gage for rendering said fluid pressure means inactive for limiting breasting movement of the knife when the cutting edge of the knife arrives at the tip of said gage.

20. In a heel breasting machine, means for positioning and clamping a shoe, a heel breasting knife, a gage for testing the position of the shoe, said gage being mounted for movement heightwise and then lengthwise of the shoe, and means operatively connected to the gage for varying the breasting stroke of the knife in accordance with the setting of said gage.

21. In a heel breasting machine, a support for a shoe, electrically controlled fluid pressure means for operating the support, a heel breasting knife mounted for reciprocation, electrically controlled fluid pressure for operating the knife, a position testing gage having a tip constructed and arranged to be positioned approximately in the path of reciprocation of the knife, and electrically controlled means operatively associated with the gage for limiting the breasting movement of the knife when it arrives at the tip of the gage.

ELIZABETH A. EICH.
*Administratrix of the Estate of Frank A. Eich, Deceased.*

NAPOLEON A. MONFILS.

REFERENCES CITED

The following references are of record in the file of this patent:

UNITED STATES PATENTS

| Number | Name | Date |
| --- | --- | --- |
| 1,289,652 | Casgrain | Dec. 31, 1918 |
| 2,002,512 | Seely et al. | May 28, 1935 |
| 2,385,482 | Winkley | Sept. 25, 1945 |